United States Patent
Uzawa

[11] Patent Number: 6,101,030
[45] Date of Patent: Aug. 8, 2000

[54] REAL IMAGE MODE VARIABLE MAGNIFICATION FINDER

[75] Inventor: Tsutomu Uzawa, Hidaka, Japan

[73] Assignee: Olympus Optical Co., Ltd., Tokyo, Japan

[21] Appl. No.: 09/321,869

[22] Filed: May 28, 1999

[30] Foreign Application Priority Data

Jun. 3, 1998 [JP] Japan .................................. 10-154572

[51] Int. Cl.$^7$ ............................. G03B 13/06; G02B 15/14
[52] U.S. Cl. .......................... 359/432; 359/362; 359/431; 359/689
[58] Field of Search ..................................... 359/362, 689, 359/420–422, 431–433, 676–677; 396/373–386

[56] References Cited

U.S. PATENT DOCUMENTS

| | | | |
|---|---|---|---|
| 5,144,349 | 9/1992 | Kato et al. ................................ | 396/379 |
| 5,257,129 | 10/1993 | Morooka et al. ........................ | 359/432 |
| 5,392,083 | 2/1995 | Miyazaki et al. ........................ | 396/373 |
| 5,552,931 | 9/1996 | Kawamura ............................... | 359/431 |
| 5,581,400 | 12/1996 | Takase et al. ........................... | 359/362 |
| 5,627,618 | 5/1997 | Kasai et al. .............................. | 396/379 |
| 5,757,543 | 5/1998 | Ogata ..................................... | 359/432 |

OTHER PUBLICATIONS

Kubota et al., Optical Technology Handbook, New Edition, Jul. 1995, p. 752.

*Primary Examiner*—Thong Nguyen
*Attorney, Agent, or Firm*—Pillsbury Madison & Sutro LLP

[57] ABSTRACT

A real image mode variable magnification finder has an objective system with positive refracting power, an image erecting optical system for erecting an object image formed by the objective system, and an eyepiece system with positive refracting power. The objective system includes a first lens unit with negative refracting power, a second lens unit with positive refracting power, and a third lens unit with positive refracting power, so that a space between the first lens unit and the second lens unit and a space between the second lens unit and the third lens unit are changed when the magnification of the finder is changed in the range from a wide-angle position to a telephoto position. The image erecting optical system has a first prism and a second prism so that a field frame is interposed between the first prism and the second prism. The finder also satisfies the following condition:

$$-0.5 < n/m < 0.5$$

where m is a distance between a field frame-side vertex of the first prism and the field frame and n is a distance between a field frame-side vertex of the second prism and the field frame.

15 Claims, 8 Drawing Sheets

SPHERICAL ABERRATION
PUPIL DIA.=5mm

−1.00 ⊢⊢⊢⊢⊢⊢⊢⊢ 1.00
(DIOPTER)

ASTIGMATISM
ω = 31.74°

−1.00 ⊢⊢⊢⊢⊢⊢⊢⊢ 1.00
(DIOPTER)

DISTORTION
ω = 31.74°

−1.00 ⊢⊢⊢⊢⊢⊢⊢⊢ 1.00
(%)

SPHERICAL ABERRATION
PUPIL DIA.=5mm

−1.00 ⊢⊢⊢⊢⊢⊢⊢⊢ 1.00
(DIOPTER)

ASTIGMATISM
ω = 19.29°

−1.00 ⊢⊢⊢⊢⊢⊢⊢⊢ 1.00
(DIOPTER)

DISTORTION
ω = 19.29°

−1.00 ⊢⊢⊢⊢⊢⊢⊢⊢ 1.00
(%)

SPHERICAL ABERRATION
PUPIL DIA.=5mm

−1.00 ⊢⊢⊢⊢⊢⊢⊢⊢ 1.00
(DIOPTER)

ASTIGMATISM
ω = 11.50°

−1.00 ⊢⊢⊢⊢⊢⊢⊢⊢ 1.00
(DIOPTER)

DISTORTION
ω = 11.50°

−1.00 ⊢⊢⊢⊢⊢⊢⊢⊢ 1.00
(%)

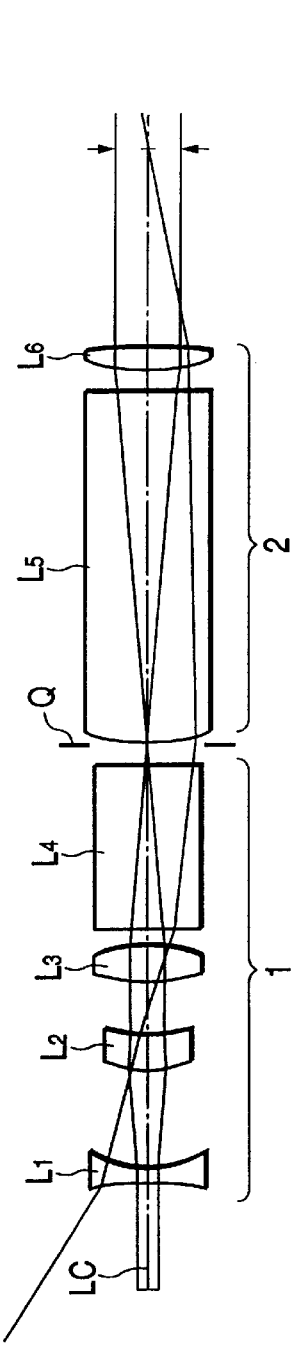
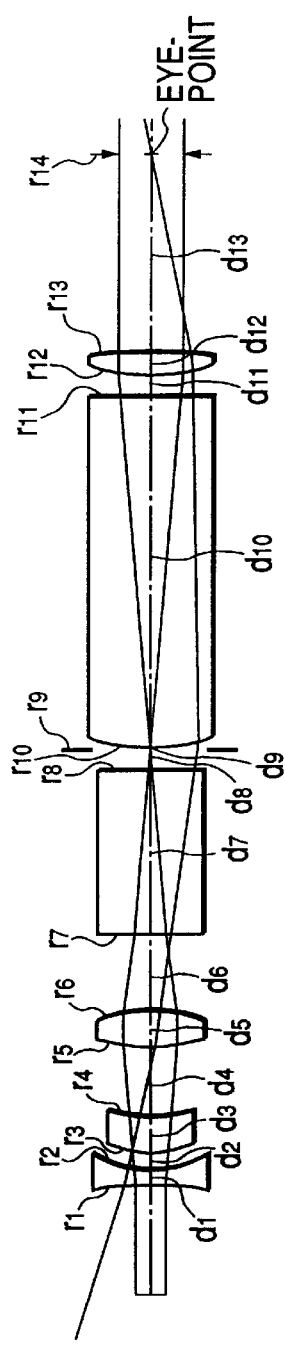
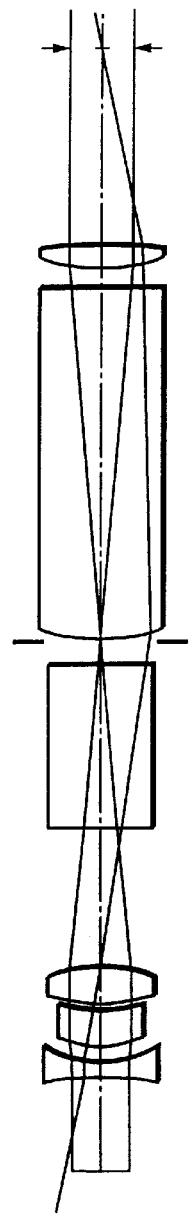
FIG. 11A
FIG. 11B
FIG. 11C

REAL IMAGE MODE VARIABLE MAGNIFICATION FINDER

BACKGROUND OF THE INVENTION

1. Field of the Invention

This invention relates to a real image mode variable magnification finder which is suitable for use in a camera in which a finder lens is constructed to be independent of a photographic lens.

2. Description of Related Art

Finders used in cameras in which a finder optical system is constructed to be independent of a photographing optical system are roughly divided into two types: a virtual image mode finder and a real image mode finder. The virtual image mode finder has the disadvantage that the diameter of a front lens must be enlarged as a variable magnification ratio is increased, which constitutes an obstacle to compactness of the camera. Furthermore, the finder optical system of this type has the problem that the view of a field frame is impaired.

In contrast to this, the real image mode finder is such that its entrance pupil can be located on the front side of the finder optical system and thus the diameter of the front lens can be diminished. Moreover, since an image formed by an objective system is observed through an eyepiece system, the defects of the virtual image mode finder are practically obviated, and a finder which has a good view of the field frame can be realized. The real image mode finder, however, has the disadvantage that dust particles deposited in the proximity of the image plane of the objective system are superimposed on the visual field and observed. Between the objective system and the eyepiece system, image erecting members for obtaining an erect image are arranged, and dust particles adhering to a surface close to the image plane, of the surfaces of these members, will also be seen in sharp focus, together with the visual field.

In keeping with compactness and high variable magnifications of cameras in recent years, finders must also follow these tendencies, and real image mode finder optical systems suitable for such compactness and high variable magnifications are often used. Many of the real image mode finders which have relatively high variable magnifications such that a variable magnification ratio is more than 2 are designed so that the objective system is of a three-lens unit zoom type. In particular, a real image mode finder in which the lens units of the objective system are arranged to have negative, positive, and positive powers in this order from the object side has an objective system with a long back focal distance. This is very advantageous for placement of a part of the image erecting members in the objective system and for compactness and simplification of the arrangement of the entire finder system. The finders in which the lens units of the objective system are arranged to have negative, positive, and positive powers as mentioned above are set forth, for example, in U.S. Pat. Nos. 5,257,129, 5,552,931, and 5,757,543.

U.S. Pat. No. 5,257,129 and the second to fourth embodiments of U.S. Pat. No. 5,757,543 are such that prism surfaces are placed immediately before and behind a field frame (field stop) which is an image plane, and dust particles, when adhering to these surfaces, will also be observed in sharp focus. The first embodiment of U.S. Pat. No. 5,757,543 is constructed so that mirrors are arranged on the object side of the field frame and thus dust particles are liable to penetrate into the field frame from the side of an objective system which is movable. U.S. Pat. No. 5,552,931 is such that prisms are switched on the object side of the field frame and thus dust particles are liable to penetrate into the field frame.

SUMMARY OF THE INVENTION

It is, therefore, an object of the present invention to provide a real image mode variable magnification finder in which a variable magnification ratio is more than 2, but its optical arrangement is simple and dust particles are invisible to the eye.

The real image mode variable magnification finder according to the present invention comprises, in order from the object side, an objective system with positive refracting power, an image erecting system for observing an intermediate image formed by the objective system as an erect image, and an eyepiece system with positive refracting power. The objective system includes, in order from the object side, a first lens unit with negative refracting power, a second lens unit with positive refracting power, and a third lens unit with positive refracting power. The image erecting system is constructed with a first prism and a second prism and has a field frame between these prisms. This finder also satisfies the following conditions:

$$-0.5 < n/m < 0.5 \tag{1}$$

$$3.5 \text{ mm}^{-1} < (m/f_e^2) \times 1000 < 11 \text{ mm}^{-1} \tag{2}$$

where m is a distance between the field frame-side vertex of the first prism and the field frame, n is a distance between the field frame-side vertex of the second prism and the field frame (however, when the field frame is located on the observation side of (eye side) the vertex of the second prism, a negative sign is affixed to the value of this distance), and fe is the focal length of the eyepiece system.

According to the present invention, the first lens unit is constructed with a single biconcave lens, the second lens unit with a single positive meniscus lens directing its convex surface toward the object side, and the third lens unit with a single biconvex lens. The object-side surface of the first lens unit is an aspherical surface whose negative refracting power reduces progressively in separating from the optical axis, the object-side surface of the second lens unit is an aspherical surface whose positive refracting power reduces further from the optical axis, and the object-side surface of the third lens unit is an aspherical surface whose positive refracting power reduces further from the optical axis.

According to the present invention, when $f_2$ denotes the focal length of the second lens unit and $f_3$ denotes the focal length of the third lens unit, the objective system is designed to satisfy the following condition:

$$0.2 < f_3/f_2 < 0.75 \tag{3}$$

According to the present invention, when $f_{123W}$ denotes a combined focal length of the first, second, and third lens units at the wide-angle position of the finder, the objective system is designed to satisfy the following condition:

$$0.5 < f_{123W}/f_3 < 0.75 \tag{4}$$

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 11A, 11B, and 11C are sectional views showing arrangements, developed along the optical axis, at wide-angle, middle, and telephoto positions, respectively, of the real image mode variable magnification finder of a fifth embodiment in the present invention.

DETAILED DESCRIPTION OF THE PREFERRED EMBODIMENTS

Figure 1A:
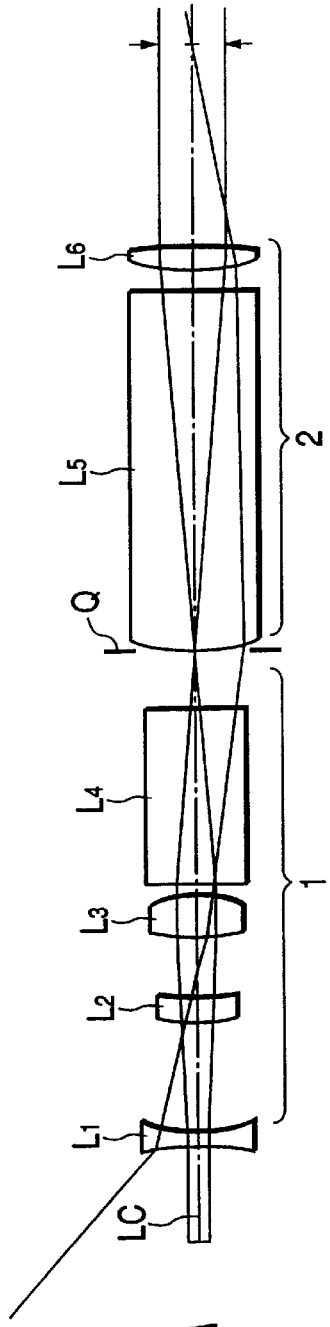
FIGS. 1A, 1B, and 1C are sectional views showing arrangements, developed along the optical axis, at wide-angle, middle, and telephoto positions, respectively, of the real image mode variable magnification finder of a first embodiment in the present invention.

In the present invention, reasons why the arrangements mentioned above are used and the function of the finder will be explained below. In order to make dust particles invisible to the eye, it is necessary to construct the finder so that (a) dust particles have difficulty penetrating into the proximity of the image plane and (b) dust particles are hard to see even though they are present.

For the former requirement, the present invention is such that the image erecting system is constructed with the first prism and the second prism and the field frame is interposed between them. This arrangement allows the field frame and its vicinity to be hermetically sealed so that dust particles are prevented from penetrating thereinto from the exterior. Hence, the possibility that dust particles adhere to the prism surfaces close to the field frame is highly limited. This structure requires an objective system which has a back focal distance sufficient to place the first prism on the object side of the image plane. For this, it is effective to place the objective system including, in order from the object side, the first lens unit with negative refracting power, the second lens unit with positive refracting power, and the third lens unit with positive refracting power.

For the latter requirement, it is necessary to satisfy Conditions (1) and (2). In order to make dust particles hard to see even though they adhere to the prism surfaces, it is effective that a distance from the field frame to each prism surface is sufficiently ensured, outside the range in which accommodation of a human eye work. However, the accommodation of the human eye has the following characteristics and an optical arrangement according to these is required. In a finder optical system, a diopter is often set so that an infinite object is seen at distances ranging from infinity to 1 m. In reference to this setting of the diopter, the accommodation of the human eye to longer distances is highly limited, while that to shorter distances is very great (refer to H. Kubota et al., "Optical Technology Handbook", new edition, K. K. Asakura Shoten, FIG. 10.39, page 752).

In the present invention, the first prism is located farther than the field frame, as viewed from the observation side (eyepiece side), while the second prism is located closer to the observation side than the field frame is. Thus, it is effective to ensure a space on the first prism side, and it is efficient to make provision against the view of dust particles on the first prism side. On the other hand, even though a space on the second prism side is sufficiently ensured, dust particles are liable to be visible, due to the accommodation of the human eye, and little effect is secured.

In this way, Condition (1) is provided to make preferential provision against the view of dust particles on the first prism side. This condition defines the ratio between the distances from the field frame to individual prism surfaces. If the upper limit of the condition is exceeded, the space on the first prism side becomes relatively narrow and the efficiency of improvement will be impaired. On the other hand, if the lower limit is passed, the second prism and the field frame become liable to interfere with each other, which is unfavorable. In order to further enhance the function and effect of Condition (1), it is desirable to modify the condition as follows:

$$-0.4 < n/m < 0.4$$

and it is more desirable to satisfy the following condition:

$$-0.4 < n/m < 0.3$$

Subsequently, Condition (2) is provided to properly set the distance from the surface of the first prism to the field frame. This condition defines the distance from the field frame-side vertex of the first prism to the field frame. If the lower limit of the condition is passed, dust particles become liable to be seen. Beyond the upper limit, the arrangement of the objective system becomes complicated and the finder optical system will be enlarged, which is unfavorable. In order to further enhance the function and effect of Condition (2), it is desirable to alter the condition as follows:

$$3.5 \text{ mm}^{-1} < (m/f_e^2) \times 1000 < 10 \text{ mm}^{-1}$$

The objective system should preferably have the following arrangement. The first lens unit is constructed with a single biconcave lens, the second lens unit with a single positive meniscus lens directing its convex surface toward the object side, and the third lens unit with a single biconvex lens. The object-side surface of the first lens unit is an aspherical surface whose negative refracting power reduces progressively further from the optical axis, the object-side surface of the second lens unit is an aspherical surface whose positive refracting power reduces further from the optical axis, and the object-side surface of the third lens unit is an aspherical surface whose positive refracting power reduces further separating from the optical axis.

In order to render a simple arrangement of the objective system and correction for aberration compatible with each other, it is effective to set proper lens configurations and to use proper aspherical surfaces. Each of the aspherical surfaces is configured so that the refracting power of the surface reduces progressively in separating from the optical axis. Thus, aberration produced by the surface itself can be reduced to a minimum. At the same time, each aspherical surface is also configured so that aberration produced by the lens unit itself is minimized.

The use of the first lens unit as the biconcave lens is advantageous for correction for spherical aberration at the telephoto position of the finder, and the configuration of the object-side surface of this lens as the aspherical surface mentioned above is advantageous for correction for distortion at the wide-angle position. The second lens unit configured as the meniscus lens directing the convex surface toward the object side has the advantage of minimizing astigmatism. The third lens unit chiefly serves to perform a variable magnification function, and it is favorable that the lens unit has a sufficient refracting power and is configured as the single biconvex lens.

On the other hand, in order to ensure a compact design and back focal distance of the objective system, it is desirable to satisfy Conditions (3) and (4).

Condition (3) defines the ratio of the focal lengths of the second and third lens units to ensure the back focal distance of the objective system. If the upper limit of the condition is exceeded, the principal point of the objective system will be shifted to the object side, and it becomes difficult to ensure the back focal distance. This is unfavorable for securing the space between the first prism and the field frame. If, on the other hand, the lower limit is passed, the result is advantageous for securing the back focal distance, but is disadvantageous for correction for distortion at the wide-angle position.

Satisfying condition (4) is advantageous for providing the third lens unit with a sufficient refracting power and for ensuring a variable magnification ratio with a short distance of movement. If the lower limit of the condition is passed, the distance of movement of the third lens unit will be increased, which is disadvantageous for compactness of the objective system. Beyond the upper limit, the result is disadvantageous for correction for aberration and is unfavorable for a simple arrangement of the objective system.

In order to change the magnification of the finder and to correct a diopter where the magnification is changed, it is necessary to move at least two lens units. In this case, it is desirable that the second and third lens units are movable. The first lens unit is fixed when the magnification is changed, and thereby the arrangement of the objective system becomes simple, with a resulting reduction in cost.

In order to further enhance the function and effect of Condition (3), it is desirable to alter the condition as follows:

$0.25 < f_3/f_2 < 0.75$

It is further desirable to satisfy the following condition:

$0.3 < f_3/f_2 < 0.7$

It is more desirable to satisfy the following condition:

$0.35 < f_3/f_2 < 0.7$

It is much more desirable to satisfy the following condition:

$0.4 < f_3/f_2 < 0.65$

In order to further enhance the function and effect intended by Condition (4), it is desirable to satisfy the following condition:

$0.55 < f_{123W}/f_3 < 0.75$

It is further desirable to satisfy the following condition:

$0.55 < f_{123W}/f_3 < 0.7$

In accordance with the embodiments shown in the drawings, the present invention will be explained below.

First Embodiment

Figure 1B:
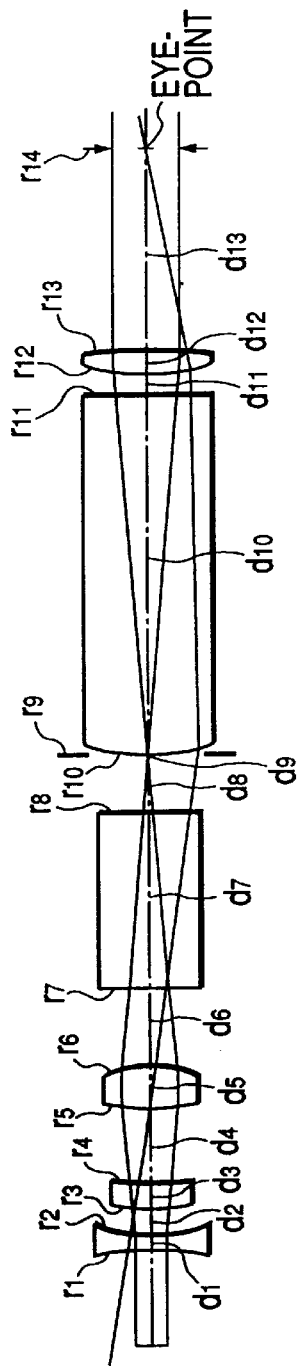
Figure 1C:
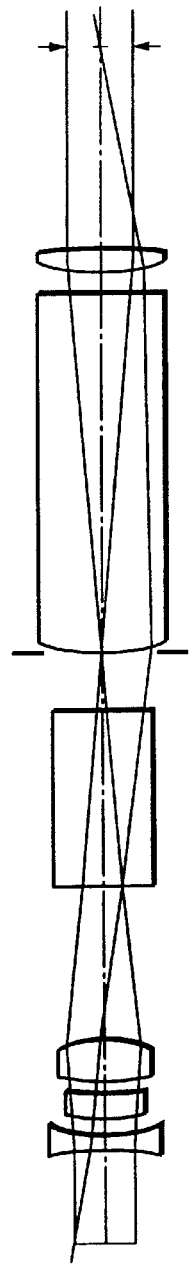

The finder of this embodiment, as shown in FIGS. 1A, 1B, and 1C, includes, in order from the object side, an objective system 1 composed of a first lens unit $L_1$ with negative refracting power, a second lens unit $L_2$ with positive refracting power, a third lens unit $L_3$ with positive refracting power, and a first prism $L_4$ as a reflecting member; an eyepiece system 2 composed of a second prism $L_5$ as a reflecting member and an eyepiece $L_6$; and a field frame Q interposed between the first prism $L_4$ and the second prism $L_5$.

Individual lens units constituting the objective system 1 are such that the first lens unit $L_1$ is fixed and the second and third lens units $L_2$ and $L_3$ are moved along an optical axis $L_c$ to change the magnification. The first prism $L_4$ and the second prism $L_5$ constitute an image erecting system. Each of the first lens unit $L_1$, the second lens unit $L_2$, the third lens unit $L_3$, and the eyepiece $L_6$ is constructed with a single lens.

Figure 2:
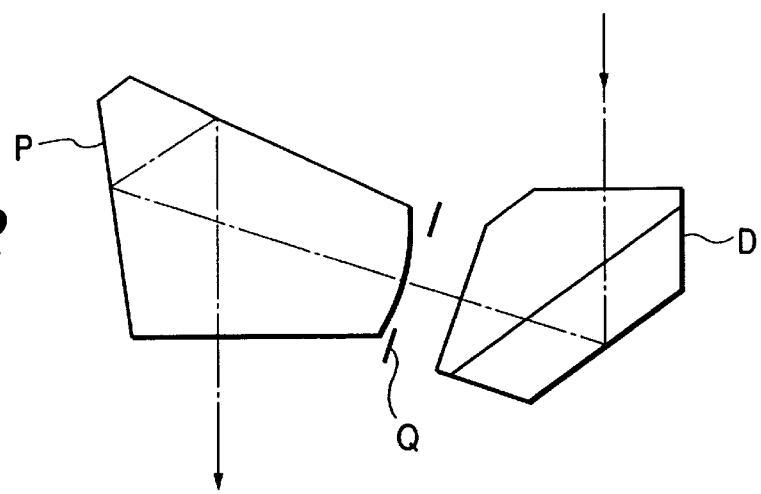
FIG. 2 is a view showing one example of a prism system for erecting an image.
Figure 3:
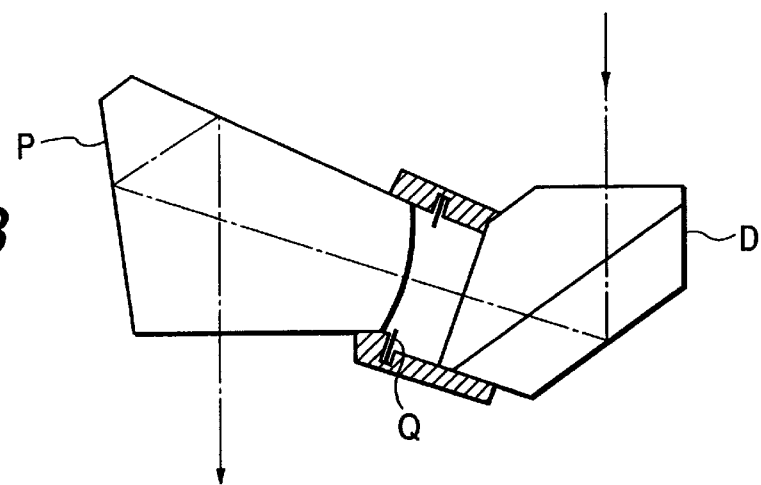
FIG. 3 is a view showing a structure for preventing the penetration of dust particles in the prism system of FIG. 2.
Figure 4:
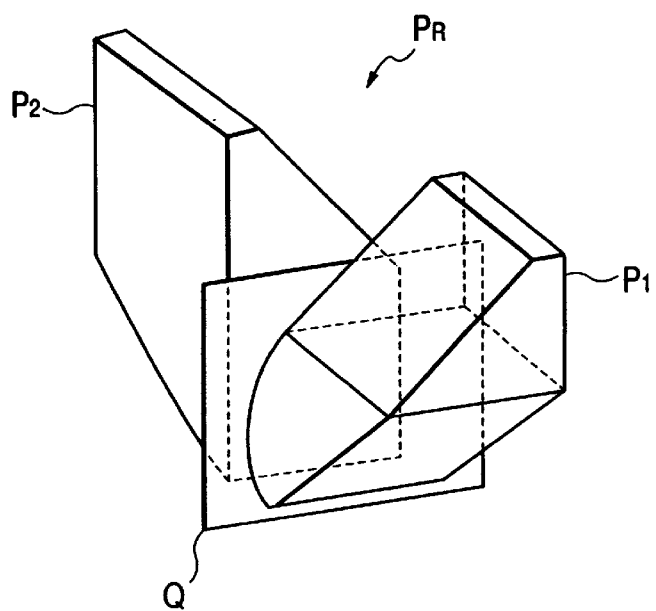
FIG. 4 is a view showing another example of the prism system for erecting the image.
Figure 5A:
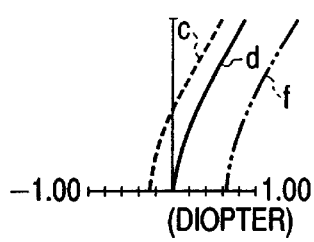
FIGS. 5A, 5B, and 5C are diagrams showing aberration characteristics at the wide-angle position of the real image mode variable magnification finder of the first embodiment.
Figure 5B:
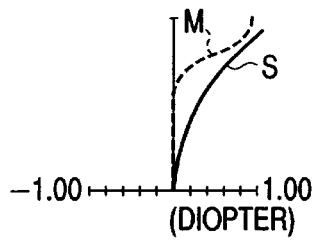
Figure 5C:
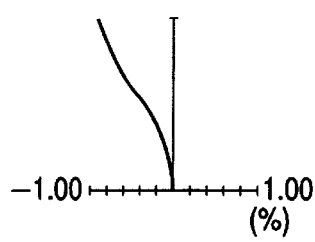
Figure 6A:
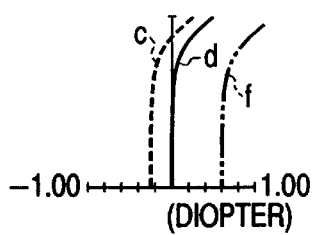
FIGS. 6A, 6B, and 6C are diagrams showing aberration characteristics at the middle position of the real image mode variable magnification finder of the first embodiment.
Figure 6B:
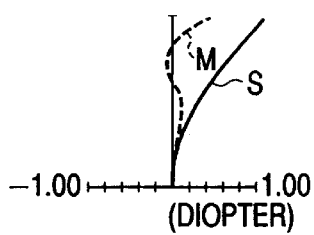
Figure 6C:
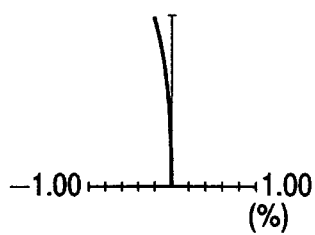
Figure 7A:
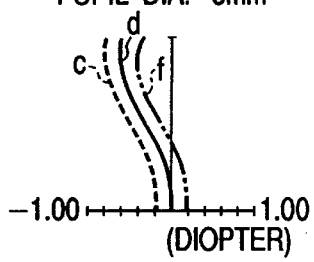
FIGS. 7A, 7B, and 7C are diagrams showing aberration characteristics at the telephoto position of the real image mode variable magnification finder of the first embodiment.
Figure 7B:
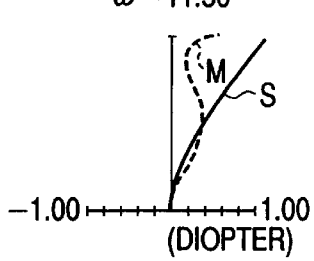
Figure 7C:
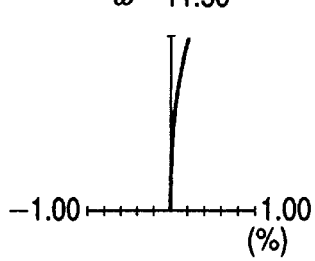

A prism system for erecting an image, as shown in FIG. 2, includes a roof prism D and a pentaprism P to interpose the field frame Q between them. Hence, as illustrated in FIG. 3, the field frame Q and its vicinity are hermetically sealed so that dust particles can be prevented from penetrating thereinto. As another example, the prism system, as shown in FIG. 4, may be constructed with a Porro prism $P_R$ composed of first and second prisms $P_1$ and $P_2$. Between these two prisms, the field frame Q is interposed. The object-side surface of the second prism $P_1$ is shaped into a lens form to possess the function of a field lens. In addition to this surface, entrance, exit, and reflection surfaces of the first and second prisms may be shaped into lens forms so that they also contribute to achieving necessary aberration correction and necessary refracting power for an entire finder.

The following are numerical data of optical members such as lenses constituting the real image mode variable magnification finder of the first embodiment. Also, FIGS. 5A–5C, 6A–6C, and 7A–7C show aberration curves relative to aberrations at the wide-angle position (a magnification of 0.34x), the middle position (a magnification of 0.57x), and the telephoto position (a magnification of 0.93x), respectively. In the first embodiment, m=4.5798, n=0, $f_e$=21.7, $f_2$=28.54, $f_3$=12.29, and $f_{123W}$=7.4. Therefore, the values of parameters shown in the above conditions are as follows:

$n/m=0$ $(m/f_e^2) \times 1000 = 9.726$ mm$^{-1}$ $f_3/f_2 = 0.431$ $f_{123W}/f_3 = 0.602$ $r_1=-20.4985$ (aspherical)
   $d_1=1.0000$ $n_1=1.58423$ $\nu_1=30.49$
$r_2=8.6073$
   $d_2=D_1$ (variable)
$r_3=9.1569$ (aspherical)
   $d_3=2.1622$ $n_3=1.49241$ $\nu_3=57.66$
$r_4=24.2323$
   $d_4=D_2$ (variable)
$r_5=19.7137$ (aspherical)
   $d_5=3.5339$ $n_5=1.49241$ $\nu_5=57.66$
$r_6=-8.2161$
   $d_6=D_3$ (variable)
$r_7=\infty$
   $d_7=13.7500$ $n_7=1.52542$ $\nu_7=55.78$
$r_8=\infty$
   $d_8=4.5798$
$r_9=\infty$
   $d_9=0.0000$
$r_{10}=11.7766$
   $d_{10}=29.5000$ $n_{10}=1.52542$ $\nu_{10}=55.78$
$r_{11}=\infty$
   $d_{11}=1.6585$
$r_{12}=16.0424$ (aspherical)
   $d_{12}=2.0000$ $n_{12}=1.49241$ $\nu_{12}=57.66$
$r_{13}=-30.6819$
   $d_{13}=16.5000$
$r_{14}=\infty$ (eyepoint)

Conic constants and aspherical coefficients
First surface
$K=0$
$A_4=1.9715\times10^{-5}$, $A_6=2.8130\times10^{-5}$,
$A_8=-9.5257\times10^{-7}$, $A_{10}=6.4364\times10^{-9}$
Third surface
$K=0$
$A_4=3.8604\times10^{-5}$, $A_6=3.4138\times10^{-6}$,
$A_8=-4.9997\times10^{-6}$, $A_{10}=1.7803\times10^{-7}$
Fifth surface
$K=0$
$A_4=-6.1504\times10^{-4}$, $A_6=-6.1442\times10^{-6}$,
$A_8=2.7676\times10^{-6}$, $A_{10}=-7.4064\times10^{-8}$
Twelfth surface
$K=0$
$A_4=-3.0164\times10^{-5}$, $A_6=-5.0477\times10^{-6}$,
$A_8=-1.3172\times10^{-9}$

| Zoom data | | | |
|---|---|---|---|
| | Wide angle position | Middle position | Telephoto position |
| $D_1$ | 8.5709 | 1.94057 | 1.32797 |
| $D_2$ | 5.17808 | 6.33690 | 0.83742 |
| $D_3$ | 1.19998 | 6.67109 | 12.78317 |

Second Embodiment

Figure 8A:
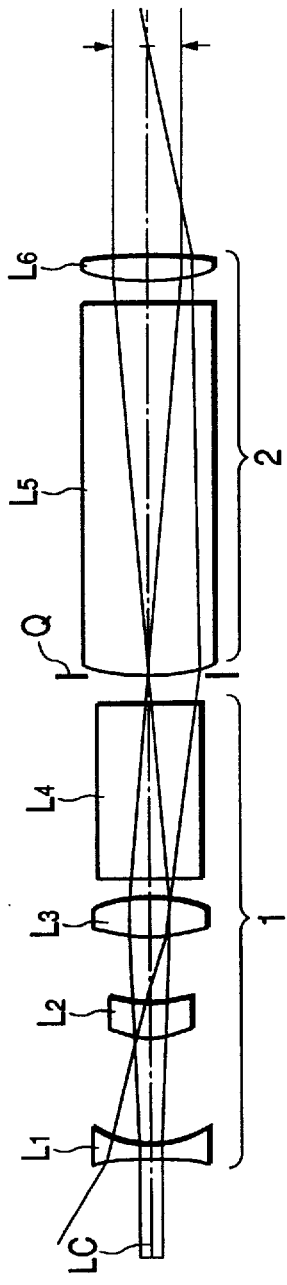
FIGS. 8A, 8B, and 8C are sectional views showing arrangements, developed along the optical axis, at wide-angle, middle, and telephoto positions, respectively, of the real image mode variable magnification finder of a second embodiment in the present invention.
Figure 8B:
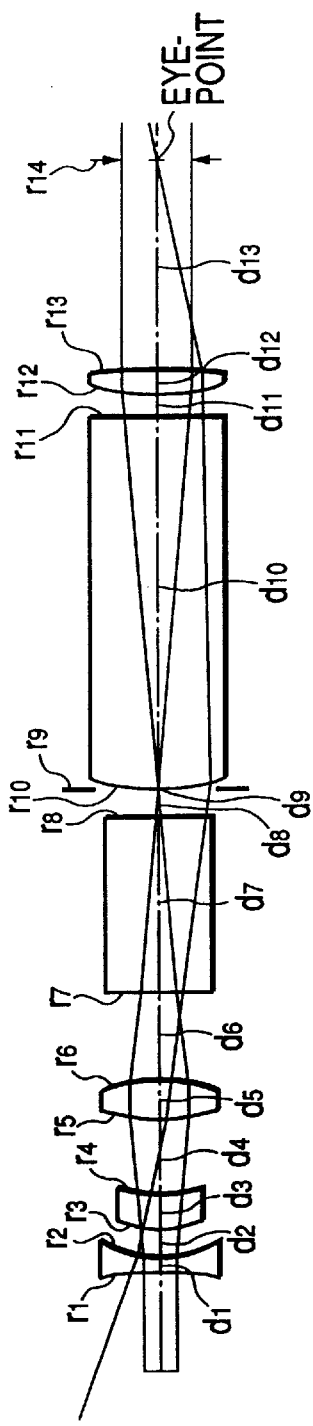
Figure 8C:
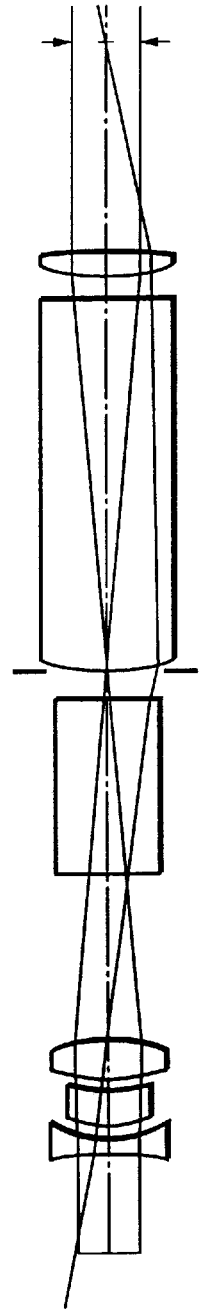

FIGS. 8A, 8B, and 8C show the arrangements of the real image mode variable magnification finder in this embodiment. The following are numerical data of optical members such as lenses constituting the real image mode variable magnification finder of the second embodiment. In the second embodiment, a half angle of view $\omega$ is 31.44° at the wide-angle position, 19.44° at the middle position, and 11.52° at the telephoto position. The magnification is 0.34 at the wide-angle position, 0.57 at the middle position, and 0.93 at the telephoto position. In the second embodiment, $m=1.9015$, $n=0$, $f_e=21.7$, $f_2=19.46$, $f_3 11.52$, and $f_{123w}=7.4$. Therefore, the values of parameters shown in the above conditions are as follows:

$$n/m=0$$

$$(m/f_e^2)\times1000=4.038 \text{ mm}^{-1}$$

$$f_3/f_2=0.592$$

$$f_{123W}/f_3=0.642$$

Also, the aberration curves in the second embodiment can be calculated from the data by ray tracing, and thus their diagrams are omitted.

$r_1=-35.1930$ (aspherical)
   $d_1=1.0000$ $n_1=1.58423$ $\nu_1=30.49$
$r_2=6.9578$
   $d_2=D_1$ (variable)
$r_3=5.0366$ (aspherical)
   $d_3=3.0000$ $n_3=1.49241$ $\nu_3=57.66$
$r_4=8.5299$
   $d_4=D_2$ (variable)
$r_5=11.8781$ (aspherical)
   $d_5=3.5075$ $n_5=1.49241$ $\nu_5=57.66$
$r_6=-9.7941$
   $d_6=D_3$ (variable)
$r_7=\infty$
   $d_7=13.7500$ $n_7=1.52542$ $\nu_7=55.78$
$r_8=\infty$
   $d_8=1.9015$
$r_9=\infty$
   $d_9=0.0000$
$r_{10}=11.4939$
   $d_{10}=29.5000$ $n_{10}=1.52542$ $\nu_{10}=55.78$
$r_{11}=\infty$
   $d_{11}=1.8484$
$r_{12}=13.1442$ (aspherical)
   $d_{12}=2.1000$ $n_{12}=1.49241$ $\nu_{12}=57.66$
$r_{13}=-54.1081$
   $d_{13}=16.5000$
$r_{14}=\infty$ (eyepoint)

Conic constants and aspherical coefficients
First surface
$K=0$
$A_4=3.9468\times10^{-4}$, $A_6=-1.8028\times10^{-5}$,
$A_8=1.2971\times10^{-6}$, $A_{10}=-3.1210\times10^{-8}$
Third surface
$K=0$
$A_4=-1.0998\times10^{-3}$, $A_6=3.9210\times10^{-5}$,
$A_8=-6.8945\times10^{-6}$, $A_{10}=2.3443\times10^{-7}$
Fifth surface
$K=0$
$A_4=-4.3783\times10^{-4}$, $A_6=-1.3257\times10^{-5}$,
$A_8=-1.0073\times10^{-7}$, $A_{10}=7.4074\times10^{-8}$
Twelfth surface
$K=0$
$A_4=-1.3099\times10^{-4}$, $A_6=6.2753\times10^{-6}$,
$A_8=-3.1057\times10^{-7}$, $A_{10}=5.0633\times10^{-9}$

| | Zoom data | | |
|---|---|---|---|
| | Wide angle position | Middle position | Telephoto position |
| $D_1$ | 7.87633 | 1.98656 | 1.01435 |
| $D_2$ | 5.13769 | 5.61205 | 0.82369 |
| $D_3$ | 1.20329 | 6.61869 | 12.37927 |

Third Embodiment

Figures 9A, 9B, 9C:
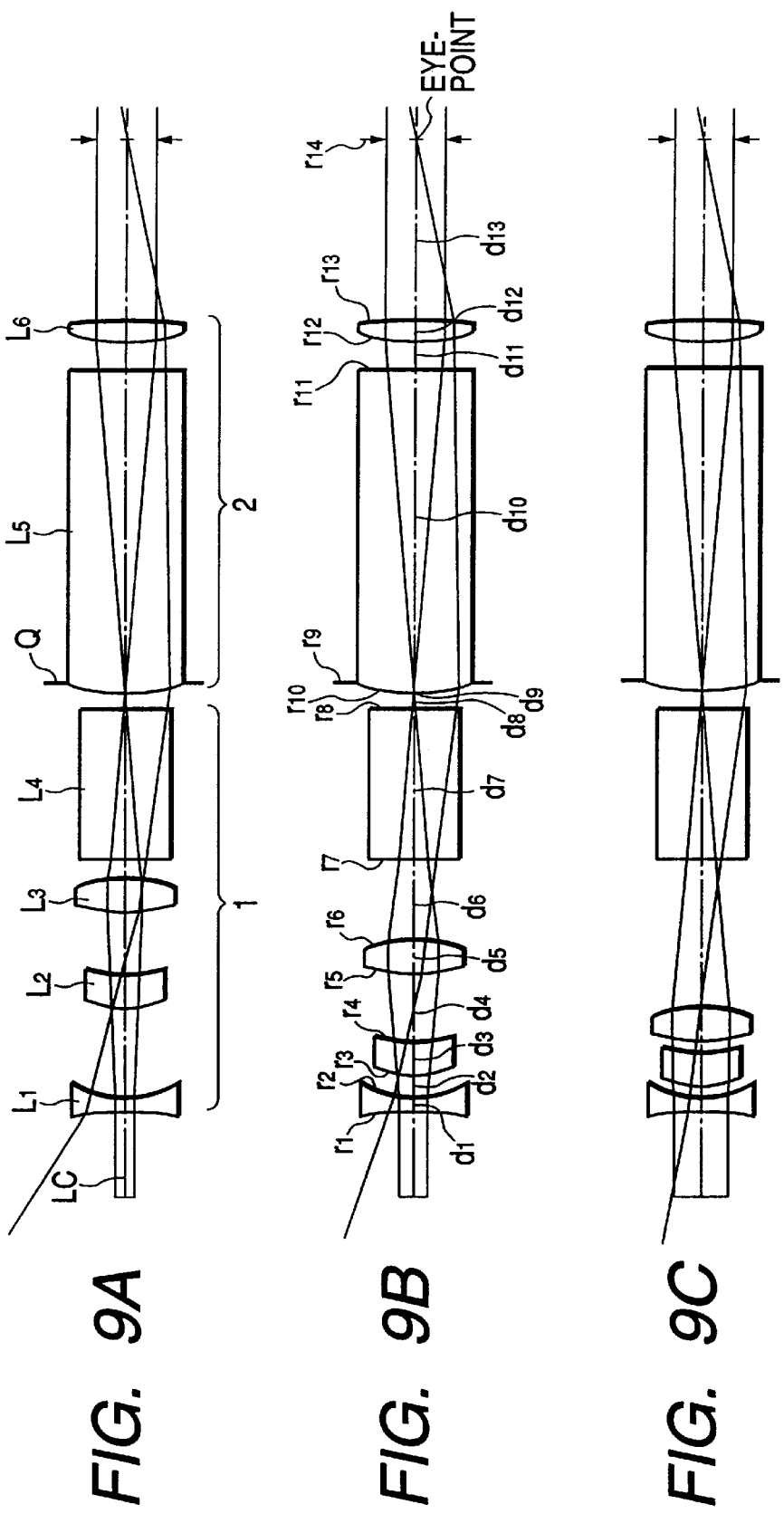
FIGS. 9A, 9B, and 9C are sectional views showing arrangements, developed along the optical axis, at wide-angle, middle, and telephoto positions, respectively, of the real image mode variable magnification finder of a third embodiment in the present invention.

FIGS. 9A, 9B, and 9C show the arrangements of the real image mode variable magnification finder in this embodiment. The following are numerical data of optical members such as lenses constituting the real image mode variable magnification finder of the third embodiment. In the third embodiment, a half angle of view ω is 32.29° at the wide-angle position, 20.02° at the middle position, and 11.86° at the telephoto position. The magnification is 0.33° at the wide-angle position, 0.55° at the middle position, and 0.9° at the telephoto position. In the third embodiment, m=2.5529, n=−1, $f_e$=21.7, $f_2$=19.56, $f_3$=11.86, and $f_{123W}$=7.4. Therefore, the values of parameters shown in the above conditions are as follows:

$n/m$=−0.392

$(m/f_e^2) \times 1000$=5.421 mm$^{-1}$ $f_3/f_2$=0.606

$f_{123W}/f_3$=0.624

Also, the aberration curves in the third embodiment can be calculated from the data by ray tracing, and thus their diagrams are omitted.

$r_1$=−29.0551 (aspherical)
  $d_1$=1.0000 $n_1$=1.58423 $v_1$=30.49
$r_2$=7.2683
  $d_2D_1$ (variable)
$r_3$=5.5692 (aspherical)
  $d_3$=3.588 $n_3$=1.49241 $v_3$=57.66
$r_4$=10.4470
  $d_4=D_2$ (varriable)
$r_5$=13.1537 (aspherical)
  $d_5$=3.5121 $n_5$=1.49241 $v_5$=57.66
$r_6$=−9.5776
  $d_6=D_3$ (variable)
$r_7=\infty$
  $d_7$=13.7500 $n_7$=1.52542 $v_7$=55.78
$r_8=\infty$
  $d_8$=2.5529
$r_9=\infty$
  $d_9$=−1.0000
$r_{10}$=11.6047
  $d_{10}$=29.5000 $n_{10}$=1.52542 $v_{10}$=55.78
$r_{11}=\infty$
  $d_{11}$=2.3657
$r_{12}$=14.8811 (aspherical)
  $d_{12}$=2.1000 $n_{12}$=1.49241 $v_{12}$=57.66
$r_{13}$=−36.1329
  $d_{13}$=16.5000
$r_{14}=\infty$(eyepoint)
Conic constants and aspherical coefficients
First surface
K=0
$A_4$=2.9818×10$^{-4}$, $A_6$=−4.3284×10$^{-6}$,
$A_8$=4.6673×10$^{-7}$, $A_{10}$=−1.2519×10$^{-8}$
Third surface
K=0
$A_4$=−9.3192×10$^{-4}$, $A_6$=6.7272×10$^{-5}$,
$A_8$=−1.1702×10$^{-5}$, $A_{10}$=5.1686×10$^{-7}$
Fifth surface
K=0
$A_4$=−3.9469×10$^{-4}$, $A_6$=−2.4546×10$^{-5}$,
$A_8$=2.6062×10$^{-6}$, $A_{10}$=−4.7309×10$^{-8}$
Twelfth surface
K=0
$A_4$=−9.7128×10$^{-5}$, $A_6$=5.0576×10$^{-6}$,
$A_8$=−2.7701×10$^{-7}$, $A_{10}$=4.8685×10$^{-9}$

| | Zoom data | | |
|---|---|---|---|
| | Wide angle position | Middle position | Telephoto position |
| $D_1$ | 8.18575 | 2.09201 | 1.04875 |
| $D_2$ | 5.27357 | 5.75266 | 0.85165 |
| $D_3$ | 1.20018 | 6.81482 | 12.75910 |

Fourth Embodiment

Figure 10A:
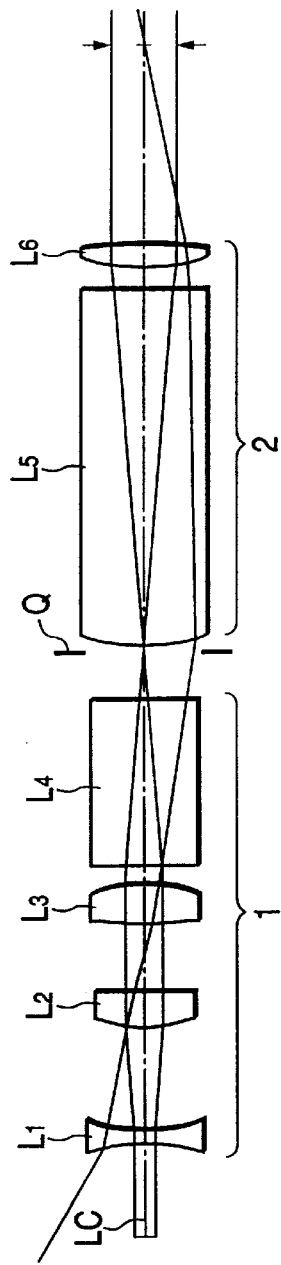
FIGS. 10A, 10B, and 10C are sectional views showing arrangements, developed along the optical axis, at wide-angle, middle, and telephoto positions, respectively, of the real image mode variable magnification finder of a fourth embodiment in the present invention.
Figure 10B:
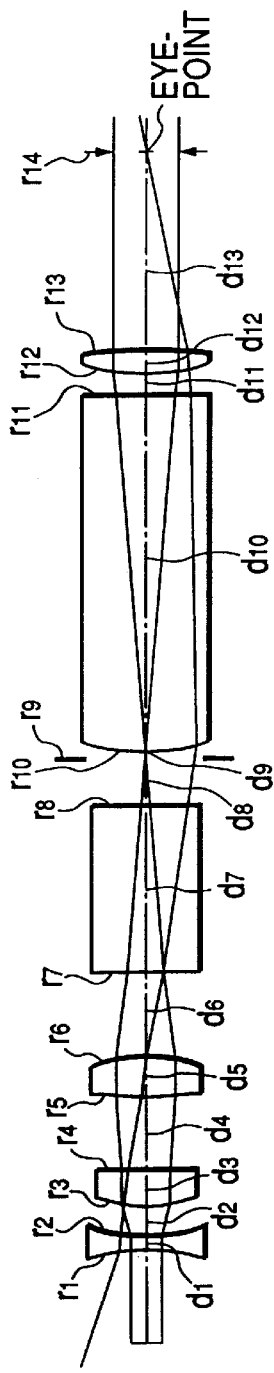
Figure 10C:
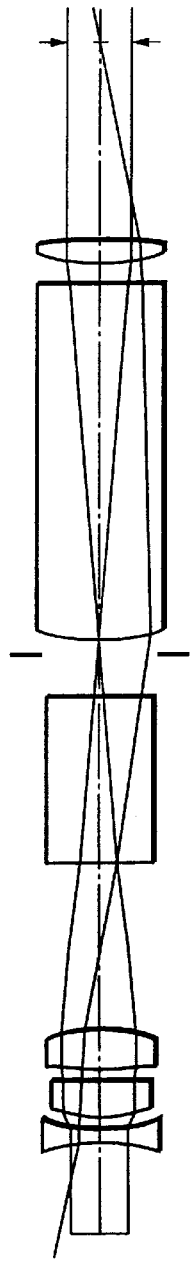

FIGS. 10A, 10B, and 10C show the arrangements of the real image mode variable magnification finder in this embodiment. The following are numerical data of optical members such as lenses constituting the real image mode variable magnification finder of the fourth embodiment. In the fourth embodiment, a half angle of view ω is 30.39° at the wide-angle position, 18.24° at the middle position, and 10.93° at the telephoto position. The magnification is 0.36 at the wide-angle position, 0.6 at the middle position, and 0.98 at the telephoto position. In the fourth embodiment, m=3.4668, n=1, $f_e$=21.7, $f_2$=20.69, $f_3$=13.28, and $f_{123W}$=7.4. Therefore, the values of parameters shown in the above conditions are as follows:

$n/m$=0.288

$(m/f_e^2) \times 1000$=7.362 mm$^{-1}$ $f_3/f_2$=0.642

$f_{123W}/f_3$=0.557

Also, the aberration curves in the fourth embodiment can be calculated from the data by ray tracing, and thus their diagrams are omitted.

$r_1$=−11.9588 (aspherical)
  $d_1$=1.0000 $n_1$=1.58423 $v_1$=30.49
$r_2$=11.2246
  $d_2=D_1$ (variable)
$r_3$=8.9210 (aspherical)
  $d_3$=2.7853 $n_3$=1.49241 $v_3$=57.66
$r_4$=64.3493
  $d_4=D_2$ (variable)
$r_5$=17.2303 (aspherical)
  $d_5$=3.5040 $n_5$=1.49241 $v_5$=57.66
$r_6$=−9.8299 (aspherical)
  d6=$D_3$ (variable)

$r_7=\infty$
  $d_7=13.7500$ $n_7=1.52542$ $v_7=55.78$
$r_8=\infty$
  $d_8=3.4668$
$r_9=\infty$
  $d_9=1.0000$
$r_{10}=10.7359$
  $d_{10}=29.5000$ $n_{10}=1.52542$ $v_{10}=55.78$
$r_{11}=\infty$
  $d_{11}=1.0862$
$r_{12}=10.6020$ (aspherical)
  $d_{12}=2.1000$ $n_{12}=1.49241$ $v_{12}=57.66$
$r_{13}=1271.8124$
  $d_{13}=16.5000$
$r_{14}=\infty$(eyepoint)

Conic constants and aspherical coefficients
First surface
$K=0$
$A_4=9.0703\times10^{-4}$, $A_6=-4.1935\times10^{-6}$,
$A_8=1.8828\times10^{-6}$, $A_{10}=-3.7521\times10^{-8}$
Third surface
$K=0$
$A_4=-6.7595\times10^{-4}$, $A_6=7.1527\times10^{-6}$,
$A_8=1.5114\times10^{-7}$, $A_{10}=-9.4091\times10^{-9}$
Fifth surface
$K=0$
$A_4=-8.4632\times10^{-4}$, $A_6=3.1577\times10^{-5}$,
$A_8=-1.9500\times10^{-6}$, $A_{10}=-1.5774\times10^{-8}$
Sixth surface
$K=0$
$A_4=-2.7925\times10^{-4}$, $A_6=1.2809\times10^{-5}$,
$A_8=-1.2386\times10^{-6}$
Twelfth surface
$K=0$
$A_4=-1.8598\times10^{-4}$, $A_6=3.6333\times10^{-6}$,
$A_8=-1.5762\times10^{-7}$, $A_{10}=2.6191\times10^{-9}$

| | Zoom data | | |
|---|---|---|---|
| | Wide angle position | Middle position | Telephoto position |
| $D_1$ | 8.27539 | 2.44550 | 0.91166 |
| $D_2$ | 5.44463 | 5.77575 | 0.92008 |
| $D_3$ | 1.19999 | 6.69877 | 13.08826 |

Fifth Embodiment

FIGS. 11A, 11B, and 11C show the arrangements of the real image mode variable magnification finder in this embodiment. The following are numerical data of optical members such as lenses constituting the real image mode variable magnification finder of the fifth embodiment. In the fifth embodiment, a half angle of view ω is 31.55° at the wide-angle position, 19.52° at the middle position, and 11.50° at the telephoto position. The magnification is 0.34 at the wide-angle position, 0.57 at the middle position, and 0.93 at the telephoto position. In the fifth embodiment, $m=1.8837$, $n=0$, $f_e=21.7$, $f_e=23.4$, $f_3=12.02$, and $f_{123W}=7.4$.

Therefore, the values of parameters shown in the above conditions are as follows:

$n/m=0$ $(m/f_e^2)\times1000=4.000$ mm$^{-1}$ $f_3/f_2=0.490$ $f_{123W}/f_3=0.699$ Also, the aberration curves in the fifth embodiment can be calculated from the data by ray tracing, and thus their diagrams are omitted.

$r_1=-42.1932$ (aspherical)
  $d_1=1.0000$ $n_1=1.58423$ $v_1=30.49$
$r_2=6.9597$
  $d_2=D_1$ (variable)
$r_3=4.6704$ (aspherical)
  $d_3=3.0000$ $n_3=1.49241$ $v_3=57.66$
$r_4=6.5577$
  $d_4=D_2$ (variable)
$r_5=10.2805$ (aspherical)
  $d_5=2.9556$ $n_5=1.49241$ $v_5=57.66$
$r_6=-9.5709$
  $d_6=D_3$ (variable)
$r_7=\infty$
  $d_7=13.7500$ $n_7=1.52542$ $v_7=55.78$
$r_8=\infty$
  $d_8=1.8837$
$d_9=\infty$
  $r_9=0.0000$
$d_{10}=11.0941$
  $d_{10}=29.5000$ $n_{10}=1.52542$ $v_{10}=55.78$
$r_{11}=\infty$
  $d_{11}=1.8404$
$r_{12}=13.2336$ (aspherical)
  $d_{12}=2.1000$ $n_{12}=1.49241$ $v_{12}=57.66$
$r_{13}=-52.5839$
  $d_{13}=16.5000$
$r_{14}=\infty$(eyepoint)

Conic constants and aspherical coefficients
First surface
$K=0$
$A_4=3.6216\times10^{-4}$, $A_6=-2.1729\times10^{-5}$,
$A_8=1.7968\times10^{-6}$, $A_{10}=-4.5886\times10^{-8}$
Third surface
$K=0$
$A_4=-1.0079\times10^{-3}$, $A_6=-6.5869\times10^{-6}$,
$A_8=-3.9760\times10^{-6}$, $A_{10}7.7143\times10^{-8}$
Fifth surface
$K=0$
$A_4=-6.3934\times10^{-4}$, $A_6=1.6565\times10^{-5}$,
$A_8=-1.9303\times10^{-6}$, $A_{10}=1.7487\times10^{-7}$
Twelfth surface
$K=0$
$A_4=-1.3789\times10^{-4}$, $A_6=6.2661\times10^{-6}$,
$A_8=-3.3805\times10^{-7}$, $A_{10}=6.1695\times10^{-9}$ Zoom data

| | Wide angle position | Middle position | Telephoto position |
|---|---|---|---|
| $D_1$ | 7.58312 | 1.34064 | 1.02969 |
| $D_2$ | 4.80557 | 5.75850 | 0.74445 |
| $D_3$ | 1.20438 | 6.49392 | 11.81893 |

Sixth Embodiment

Figure 12A:
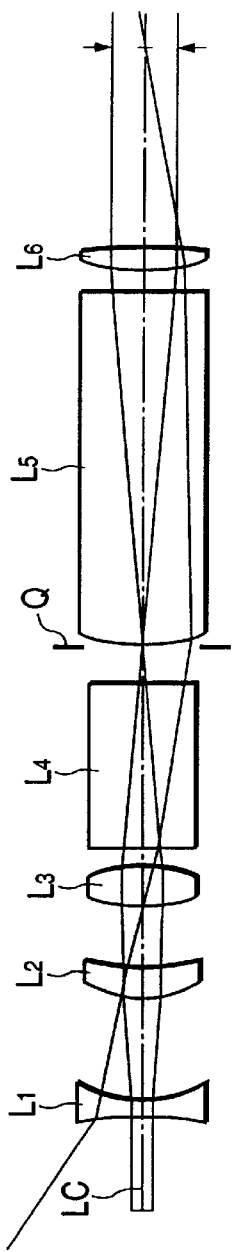
FIGS. 12A, 12B, and 12C are sectional views showing arrangements, developed along the optical axis, at wide-angle, middle, and telephoto positions, respectively, of the real image mode variable magnification finder of a sixth embodiment in the present invention.
Figure 12B:
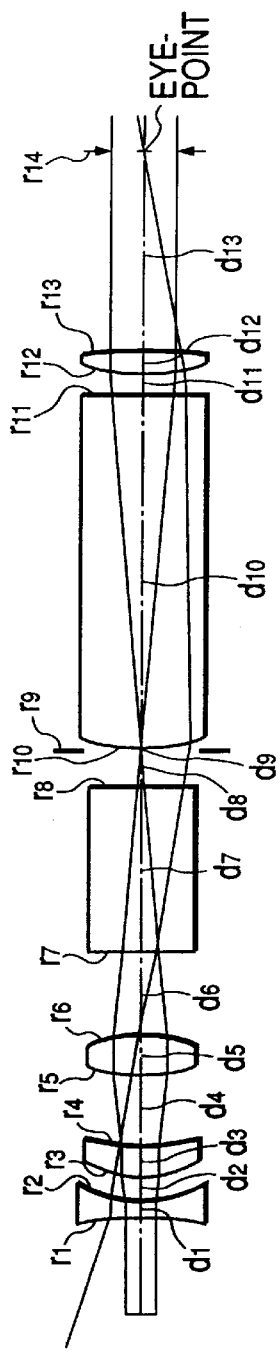
Figure 12C:
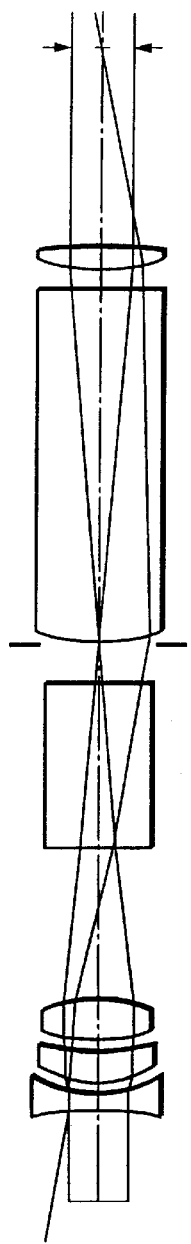

FIGS. 12A, 12B, and 12C show the arrangements of the real image mode variable magnification finder in this embodiment. The following are numerical data of optical members such as lenses constituting the real image mode variable magnification finder of the sixth embodiment. In the sixth embodiment, a half angle of view ω is 31.42° at the wide-angle position, 18.92° at the middle position, and 11.20° at the telephoto position. The magnification is 0.35 at the wide-angle position, 0.57 at the middle position, and 0.94 at the telephoto position. In the sixth embodiment, m=3.1316, n=0, $f_e$21.7, $f_2$=23.4, $f_2$=21.62, $f_3$=10.59, and $f_{123W}$=7.4. Therefore the values of parameters shown in the above conditions are as follows:

$n/m=0$ $(m/f_e^2) \times 1000$ 6.650 mm$^{-1}$ $f_3/f_2 = 0.514$ $f_{123W}/f_3 = 0.616$ Also, the aberration curves in the sixth embodiment can be calculated from the data by ray tracing, and thus their diagrams are omitted.

$r_1 = -13.6607$ (aspherical)
  $d_1 = 1.0000$  $n_1 = 1.58423$  $v_1 = 30.49$
$r_2 = 11.0203$
  $d_2 = D_1$ (variable)
$r_3 = 5.8847$ (aspherical)
  $d_3 = 2.3249$  $n_3 = 1.49241$  $v_3 = 57.66$
$r_4 = 10.4609$
  $d_4 = D_2$ (variable)
$r_5 = 13.3250$ (aspherical)
  $d_5 = 3.5147$  $n_5 = 1.49241$  $v_5 = 57.66$
$r_6 = -9.7252$
  $d_6 = D_3$ (variable)
$r_7 = \infty$
  $d_7 = 13.7500$  $n_7 1.52542$  $v_7 = 55.78$
$r_8 = \infty$
  $d_8 = 3.1316$
$r_9 = \infty$
  $d_9 = 0.0000$
$r_{10} = 9.7440$
  $d_1 = 29.5000$  $n_{10} = 1.52542$  $v_{10} = 55.78$
$r_{11} = \infty$
  $d_{11} = 1.7386$
$r_{12} = 12.1218$ (aspherical)
  $d_{12} = 2.1000$  $n_{12} = 1.49241$  $v_{12} = 57.66$
$r_{13} = -85.0138$
  $d_{13} = 16.5000$
$r_{14} = \infty$(eyepoint)

Conic constants and aspherical coefficients
First surface
$K=0$
$A_4 = 3.7011 \times 10^{-4}$, $A_6 = 9.0151 \times 10^{-6}$,
$A_8 = -5.7940 \times 10^{-7}$, $A_{10} = 1.1220 \times 10^{-8}$
Third surface
$K=0$
$A_4 = -6.9000 \times 10^{-4}$, $A_6 = -2.7618 \times 10^{-5}$,
$A_8 = 1.0024 \times 10^{-6}$, $A_{10} = -3.7851 \times 10^{-8}$
Fifth surface
$K=0$
$A_4 = -6.0036 \times 10^{-4}$, $A_6 = 6.5626 \times 10^{-6}$,
$A_8 = -1.4607 \times 10^{-7}$, $A_{10} = 9.3357 \times 10^{-9}$
Twelfth surface
$K=0$
$A_4 = -1.3413 \times 10^{-4}$, $A_6 = 3.6868 \times 10^{-6}$,
$A_8 = -1.8360 \times 10^{-7}$, $A_{10} = 2.8487 \times 10^{-9}$ Zoom data

| | Wide angle position | Middle position | Telephoto position |
|---|---|---|---|
| $D_1$ | 8.46461 | 2.03837 | 0.98527 |
| $D_2$ | 5.22550 | 6.18202 | 1.24109 |
| $D_3$ | 1.20000 | 6.66972 | 12.66375 |

In the numerical data shown in the above embodiments, $r_1, r_2, \ldots$ represent radii of curvature of individual lens or prism surfaces; $d_1, d_2, \ldots$ represent thicknesses of individual lenses or prisms, or spaces therebetween; $n_1, n_2, \ldots$ represent refractive indices of individual lenses or prisms at the d-line; and $v_1, v_2, \ldots$ represent Abbe's numbers of individual lenses or prisms. Also, when Z is taken as the coordinate in the direction of the optical axis, Y is taken as the coordinate in the direction normal to the optical axis, K denotes a conic constant, and $A_4$, $A_6$, $A_8$, and $A_{10}$ denote aspherical coefficients, the configuration of each of the aspherical surfaces in the embodiments is expressed by the following equation:

$$Z = (Y^2/r)/[1+\{1-(1+K)(Y/r)^2\}^{1/2}] + A_4 Y^4 + A_6 Y^6 + A_8 Y^8 + A_{10} Y^{10}$$

What is claimed is:

1. A real image mode variable magnification finder, comprising:
   an objective system with positive refracting power;
   an image erecting optical system constructed and arranged to erect an object image formed by said objective system; and
   an eyepiece system with positive refracting power,
   said objective system comprising, in order from an object side;
     a first lens unit with negative refracting power;
     a second lens unit with positive refracting power; and
     a third lens unit with positive refracting power,
     a space between said first lens unit and said second lens unit and a space between said second lens unit and said third lens unit being changed when a magnification of said finder is changed in a range from a wide-angle position to a telephoto position,
   said image erecting optical system having a first prism and a second prism so that a field frame is interposed between said first prism and said second prism, and said finder satisfying the following conditions:

$$3.5\ \text{mm}^{-1} < (m/f_e^2) \times 1000 < 11\ \text{mm}^{-1}$$

where m is a distance from a field frame-side vertex of said first prism to said field frame and $f_e$ is a focal length of said eyepiece system.

2. A real image mode variable magnification finder, comprising:

an objective system with positive refracting power;

an image erecting optical system constructed and arranged to erect an object image formed by said objective system; and an eyepiece system with positive refracting power, said objective system including, in order from an object side;
  a first lens unit with negative refracting power;
  a second lens unit with positive refracting power; and
  a third lens unit with positive refracting power,
  a space between said first lens unit and said second lens unit and a space between said second lens unit and aid third lens unit being changed when a magnification of said finder is changed in a range from a wide-angle position to a telephoto position, said image erecting optical system having a first prism and a second prism so that a field frame is interposed between said first prism and said second prism, and said finder satisfying the following conditions:

$$-0.5 < n/m < 0.5$$

$$3.5\ \text{mm}^{-1} < (m/f_e^2) \times 1000 < 11\ \text{mm}^{-1}$$

where m is a distance from a field frame-side vertex of said first prism to said field frame, n is a distance from said field frame to a field-frame side vertex of said second prism wherein the distance n is defined to take a negative value if said field frame is located on an observation side of the field-frame vertex of said second prism, and $f_e$ is a focal length of said eyepiece system.

3. A real image mode variable magnification finder comprising:

an objective system with positive refracting power;

an image erecting optical system constructed and arranged to erect an object image formed by said objective system; and an eyepiece system with positive refracting power, said objective system including, in order from an object side:
  a first lens unit with negative refracting power;
  a second lens unit with positive refracting power; and
  a third lens unit with positive refracting power,
  a space between said first lens unit and said second lens unit and a space between said second lens unit and said third lens unit being changed when a magnification of said finder is changed in a range from a wide-angle position to a telephoto position, said image erecting optical system having a first prism and a second prism so that a field frame is interposed between said first prism and said second prism, and said finder satisfying the following conditions:

$$-0.5 < n/m < 0.5$$

$$3.5\ \text{mm}^{-1} < (m/f_e^2) \times 1000 < 11\ 1\ \text{mm}^{-1}$$

$$0.2 < f_3/f_2 < 0.75$$

$$0.5 < f_{123W}/f_3 < 0.75$$

where m is a distance from a field frame-side vertex of said first prism to said field frame, n is a distance from said field frame to a field frame-side vertex of said second prism wherein the distance n is defined to take a negative value if said field frame is located on an observation side of the field frame-side vertex of said second prism, $f_e$ is a focal length of said eyepiece system, $f_2$ is a focal length of said second lens unit, $f_3$ is a focal length of said third lens unit, and $f_{123W}$ is a combined focal length of said first lens unit, said second lens unit, and said third lens unit at the wide-angle position.

4. A real image mode variable magnification finder according to claim 1 or 2, wherein said objective system satisfies the following condition:

$$0.2 < f_3/f_2 < 0.75$$

where $f_2$ is a focal length of said second lens unit and $f_3$ is a focal length of said third lens unit.

5. A real image mode variable magnification finder according to claim 1 or 2, wherein said objective system satisfies the following condition:

$$9.5 < f_{123W}/f_3 < 0.75$$

where $f_3$ is a focal length of said third lens unit and $f_{123W}$ is a combined focal length of said first lens unit, said second lens unit, and said third lens unit at the wide-angle position.

6. A real image mode variable magnification finder according to claim 1, 2, or 3, wherein said objective system is constructed so that said first lens unit is fixed and said second lens unit and said third lens unit are moved along an optical axis when the magnification is changed in a range from the wide-angle position to a telephoto position.

7. A real image mode variable magnification finder according to claim 1, 2, or 3, wherein said first lens unit is constructed with a single biconcave lens, said second lens unit is constructed with a single positive meniscus lens directing a convex surface toward the object side, and said third lens unit is constructed with a single biconvex lens.

8. A real image mode variable magnification finder according to claim 1, 2, or 3, wherein:

an object-side surface of said first lens unit is configured as an aspherical surface whose negative refracting power reduces progressively further from an optical axis, an object-side surface of said second lens unit is configured as an aspherical surface whose positive refracting power reduces progressively further from the optical axis, and an object-side surface of aid third lens unit is configured as an aspherical surface whose positive refracting power reduces progressively further from the optical axis.

9. A real image mode variable magnification finder according to claim 1, 2, or 3, wherein:

said first lens unit consists of a single biconcave lens and an object-side surface of said single biconcave lens is an aspherical surface whose negative refracting power reduces progressively further from an optical axis, said second lens unit consists of a single positive meniscus lens directing a convex surface toward the object side and an object-side surface of said single positive meniscus lens is an aspherical surface whose positive refracting power reduces progressively further from the optical axis, and said third lens unit is constructed with a single biconvex lens and an object-side surface of said single biconvex lens is an aspherical surface whose positive refracting power reduces progressively further from the optical axis.

10. A real image mode variable magnification finder according to claim 1, 2, or 3, wherein said image erecting optical system has an optical surface with positive power, said optical surface being disposed in the proximity of said field frame and functioning as a field lens.

11. A real image mode variable magnification finder according to claim 10, wherein said optical surface with positive power is located at a position of an entrance surface of said second prism.

12. A real image mode variable magnification finder according to claim 1, 2 or 3, further satisfying the following condition:

$$4.000 \text{ mm}^{-1} \leq (m/f_e^2) \times 1000 < 11 \text{ mm}^{-1}.$$

13. A real image mode variable magnification finder according to claims 1, 2 or 3, further satisfying the following condition:

$$5.421 \text{ mm}^{-1} < (m/f_e^2) \times 1000 < 11 \text{ mm}^{-1}.$$

14. A real image mode variable magnification finder according to claim 3, further satisfying the following condition:

$$0.4 < f_3/f_2 < 0.65.$$

15. A real image mode variable magnification finder according to claim 3 or 14, further satisfying the following condition:

$$0.56 < f_{123W}/f_3 < 0.7.$$

* * * * *